US012769138B2

(12) United States Patent
Jo et al.

(10) Patent No.: US 12,769,138 B2
(45) Date of Patent: Oct. 20, 2026

(54) HEAD-MOUNTABLE DEVICE WITH ADAPTABLE FIT

(71) Applicant: Apple Inc., Cupertino, CA (US)

(72) Inventors: Yoonhoo Jo, Santa Cruz, CA (US); Scott M. Leinweber, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 371 days.

(21) Appl. No.: 18/125,065

(22) Filed: Mar. 22, 2023

(65) Prior Publication Data

US 2023/0229008 A1 Jul. 20, 2023

Related U.S. Application Data

(63) Continuation of application No. PCT/US2021/047580, filed on Aug. 25, 2021.

(60) Provisional application No. 63/082,377, filed on Sep. 23, 2020.

(51) Int. Cl.
*G02B 27/01* (2006.01)

(52) U.S. Cl.
CPC ..... *G02B 27/0176* (2013.01); *G02B 27/0172* (2013.01); *G02B 2027/0138* (2013.01); *G02B 2027/0158* (2013.01); *G02B 2027/0169* (2013.01)

(58) Field of Classification Search
CPC .......... G02B 27/017; G02B 2027/0154; G02B 2027/0138
See application file for complete search history.

(56) References Cited

U.S. PATENT DOCUMENTS

| | | | | |
|---|---|---|---|---|
| 2,979,729 | A * | 4/1961 | Hirschmann, Jr. | G02C 5/08 2/446 |
| 9,910,298 | B1 * | 3/2018 | Sales | G02C 11/10 |
| 10,045,449 | B1 | 8/2018 | Yee | |
| 2018/0239151 | A1 * | 8/2018 | Chang | G02B 27/0176 |
| 2020/0050236 | A1 | 2/2020 | Lin et al. | |
| 2020/0233453 | A1 | 7/2020 | Hatfield et al. | |

FOREIGN PATENT DOCUMENTS

| | | |
|---|---|---|
| CN | 105555345 A | 5/2016 |
| CN | 108459413 A | 8/2018 |
| CN | 111123512 A | 5/2020 |

OTHER PUBLICATIONS

International Search Report and Written Opinion from PCT/US2021/047580, dated Jan. 3, 2022, 15 pages.
Chinese Patent Application No. 202180078559.4; Office Action dated Aug. 2, 2025, 20 X pages with machine translation.

* cited by examiner

*Primary Examiner* — Lauren Nguyen
(74) *Attorney, Agent, or Firm* — BAKERHOSTETLER

(57) ABSTRACT

A head-mountable device can include adaptable components, which move to comfortably engage the face of the user and to exclude light from an external environment. A head-mountable device can include a light seal element that includes discrete portions that rotate relative to each other and to a user. Such mobility allows the portions to be oriented with respect to corresponding regions of the face, so that an engagement surface of each portion directly engages the corresponding region of the face to maximize the surface area of contact.

22 Claims, 4 Drawing Sheets

HEAD-MOUNTABLE DEVICE WITH ADAPTABLE FIT

CROSS-REFERENCE TO RELATED APPLICATIONS

This application is a continuation of International Application No. PCT/US2021/0047580, entitled "HEAD-MOUNTABLE DEVICE WITH ADAPTABLE FIT," filed Aug. 25, 2021, which claims the benefit of U.S. Provisional Application No. 63/082,377, entitled "HEAD-MOUNTABLE DEVICE WITH ADAPTABLE FIT," filed Sep. 23, 2020, the entirety of which is incorporated herein by reference.

TECHNICAL FIELD

The present description relates generally to head-mountable devices, and, more particularly, to light seal elements of head-mountable devices having adaptable fit capabilities.

BACKGROUND

A head-mountable device can be worn by a user to display visual information within the field of view of the user. The head-mountable device can be used as a virtual reality (VR) system, an augmented reality (AR) system, and/or a mixed reality (MR) system. A user may observe outputs provided by the head-mountable device, such as visual information provided on a display. The display can optionally allow a user to observe an environment outside of the head-mountable device. Other outputs provided by the head-mountable device can include speaker output and/or haptic feedback. A user may further interact with the head-mountable device by providing inputs for processing by one or more components of the head-mountable device. For example, the user can provide tactile inputs, voice commands, and other inputs while the device is mounted to the user's head.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

Figure 1:
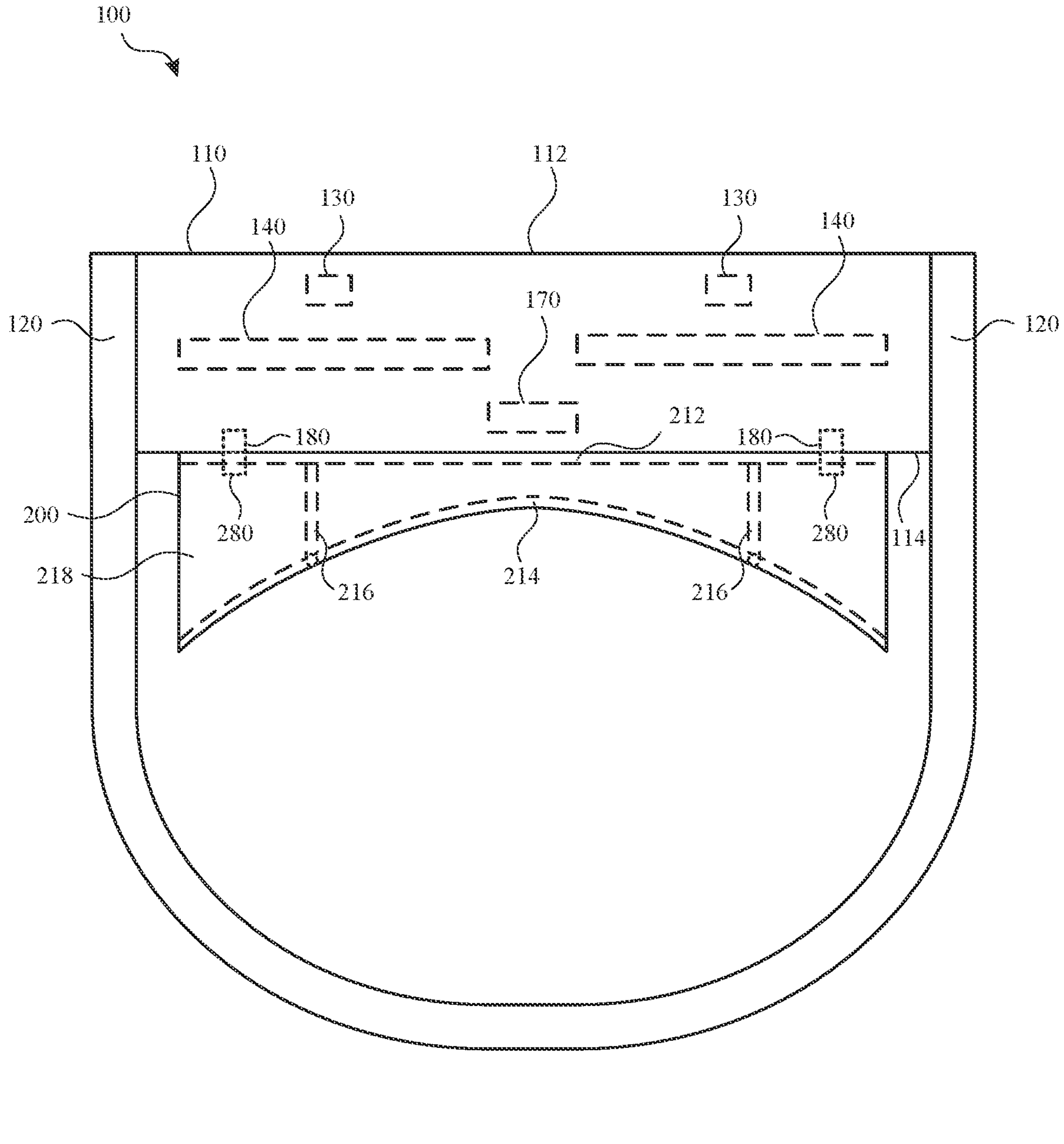
FIG. 1 illustrates a top view of a head-mountable device with a light seal element, according to some embodiments of the present disclosure.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Head-mountable devices, such as head-mountable displays, headsets, visors, smartglasses, head-up display, etc., can perform a range of functions that are managed by the components (e.g., sensors, circuitry, and other hardware) included with the wearable device.

Many of the functions performed by a head-mountable device are optimally experienced when the components are in their most preferred position and orientation with respect to a user wearing the head-mountable device. For example, the head-mountable device can include a display element that visually outputs display-based information toward the eyes of the user. The position and orientation of the display elements relative to the eyes depends, at least in part, on how the head-mountable device is positioned on the face of the user. Due to variations in facial features across different users, a given head-mountable device may require adjustment to accommodate different users. For example, different users can have different facial features (e.g., face plane slope, forehead size, eye location). Accordingly, different users may perceive the displayed information differently unless a preferred arrangement is provided.

It can be costly to require each user to acquire an entire head-mountable device that is specifically tailored to their facial features. Accordingly, it can be desirable to provide face engagement features that adapt and conform to a user's face to maximize comfort and light sealing capabilities.

Embodiments of the present disclosure provide a head-mountable device that provides adaptable components, which move to comfortably engage the face of the user and to exclude light from an external environment. A head-mountable device can include a light seal element that includes discrete portions that rotate relative to each other and to a user. Such mobility allows the portions to be oriented with respect to corresponding regions of the face, so that an engagement surface of each portion directly engages the corresponding region of the face to maximize the surface area of contact.

These and other embodiments are discussed below with reference to FIGS. 1-7. However, those skilled in the art will readily appreciate that the detailed description given herein with respect to these Figures is for explanatory purposes only and should not be construed as limiting.

According to some embodiments, for example as shown in FIG. 1, a head-mountable device 100 includes a frame 110 and a light seal element 200 that are worn on a head of a user. The frame 110 can be positioned in front of the eyes of a user to provide information within a field of view of the user. The frame 110 and/or the light seal element 200 can provide a nosepiece to rest on a user's nose.

The frame 110 can provide structure around a peripheral region thereof to support any internal components of the frame 110 in their assembled position. For example, the frame 110 can enclose and support various internal components (including for example integrated circuit chips, processors, memory devices and other circuitry) to provide computing and functional operations for the head-mountable device 100, as discussed further herein. While several components are shown within the frame 110, it will be understood that some or all of these components can be located anywhere within or on the head-mountable device 100. For example, one or more of these components can be positioned within the light seal element 200 and/or a head securement element 120 of the head-mountable device 100.

The frame 110 can include and/or support one or more cameras 130. The cameras 130 can be positioned on or near an outer side 112 of the frame 110 to capture images of views external to the head-mountable device 100. As used herein, an outer side of a portion of a head-mountable device is a side that faces away from the user and/or towards an external environment. The captured images can be used for display to the user or stored for any other purpose. Each of the cameras 130 can be movable along the outer side 112. For example, a track or other guide can be provided for facilitating movement of the camera 130 therein.

The head-mountable device 100 can include display elements 140 that provide visual output for viewing by a user wearing the head-mountable device 100. One or more display elements 140 can be positioned on or near an inner side 114 of the frame 110. As used herein, an inner side 114 of a portion of a head-mountable device is a side that faces toward the user and/or away from the external environment.

A display element 140 can transmit light from a physical environment (e.g., as captured by a camera) for viewing by the user. Such a display element 140 can include optical properties, such as lenses for vision correction based on incoming light from the physical environment. Additionally or alternatively, a display element 140 can provide information as a display within a field of view of the user. Such information can be provided to the exclusion of a view of a physical environment or in addition to (e.g., overlaid with) a physical environment.

A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations, (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground.

Examples of mixed realities include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head-mountable systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head-mountable system may have one or more speaker(s) and an integrated opaque display. Alternatively, a head-mountable system may be configured to accept an external opaque display (e.g., a smartphone). The head-mountable system may incorporate one or more imaging sensors to capture images or video of the physical environment, and/or one or more microphones to capture audio of the physical environment. Rather than an opaque display, a head-mountable system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Each display element 140 can be adjusted to align with a corresponding eye of the user. For example, each display element 140 can be moved along one or more axes until a center of each display element 140 is aligned with a center of the corresponding eye. Accordingly, the distance between the display elements 140 can be set based on an interpupillary distance ("IPD") of the user. IPD is defined as the distance between the centers of the pupils of a user's eyes.

As further shown in FIG. 1, the light seal element 200 can include a chassis that provides structural support to one or more other components of the light seal element 200. The chassis can include an inner side 214, an outer side 212, and bridge elements 216 connecting the inner side 214 to the outer side 212. The inner side 214, the outer side 212, and/or the bridge elements 216 can support a cover 218 that extends at least partially from the outer side 212 to the inner side 214. It will be understood that the cover 218 can move, flex, and/or stretch to accommodate the adjustment capabilities of the inner side 214 described further herein.

As further shown in FIG. 1, attachment elements can facilitate coupling of the frame 110 to the light seal element 200 in a relative position and orientation that aligns the display elements 140 of the frame 110 in a preferred position and orientation for viewing by the user. The frame 110 and the light seal element 200 can be coupled to prevent ingress of light from an external environment. For example, frame attachment elements 180 can releasably engage light seal attachment elements 280. One or more of various mechanisms can be provided to secure the modules to each other. For example, mechanisms such as locks, latches, snaps, screws, clasps, threads, magnets, pins, an interference (e.g., friction) fit, knurl presses, bayoneting, and/or combinations thereof can be included to couple and/or secure the frame 110 and the light seal element 200 together. The modules can remain secured to each other until an optional release mechanism is actuated. The release mechanism can be provided on an outer surface of the head-mountable device 100 for access by a user.

While the light seal element 200 is shown schematically with a particular size and shape, it will be understood that the size and shape of the light seal element 200, particularly at the inner side 214 of the light seal element 200, can have a size and shape that accommodates the face of a user wearing the head-mountable device 100. For example, the inner side 214 can provide a shape that generally matches the contours of the user's face around the eyes of the user. The inner side 214 can be provided with one or more features that allow the light seal element 200 to conform to the face of the user to enhance comfort and block light from entering the light seal element 200 at the point of contact with the face. For example, the inner side 214, or portions thereof, can provide a flexible, soft, elastic, and/or compliant structure, as described further herein.

The frame 110 and/or the light seal element 200 can be supported on a user's head with a head securement element 120. The head securement element 120 can wrap or extend along opposing sides of a user's head and/or to a rear of the user's head. The head securement element 120 can optionally include earpieces for wrapping around or otherwise engaging or resting on a user's ears. It will be appreciated that other configurations can be applied for securing the head-mountable device 100 to a user's head. For example, one or more bands, straps, belts, caps, hats, or other components can be used in addition to or in place of the illustrated head securement element 120 of the head-mountable device 100. The head securement element 120 can optionally include a band for extending to and/or about a rear side of the head of the user. The head securement element 120 can optionally extend from the frame 110 or another component coupled to the frame 110. For example, the head securement element 120 can optionally extend from the light seal element 200. The band can be stretchable to comfortably provide tension about the head of the user. The head securement element can further include an adjustment element (not shown) for adjusting a tightness and/or fit of the head securement element.

Figure 2:
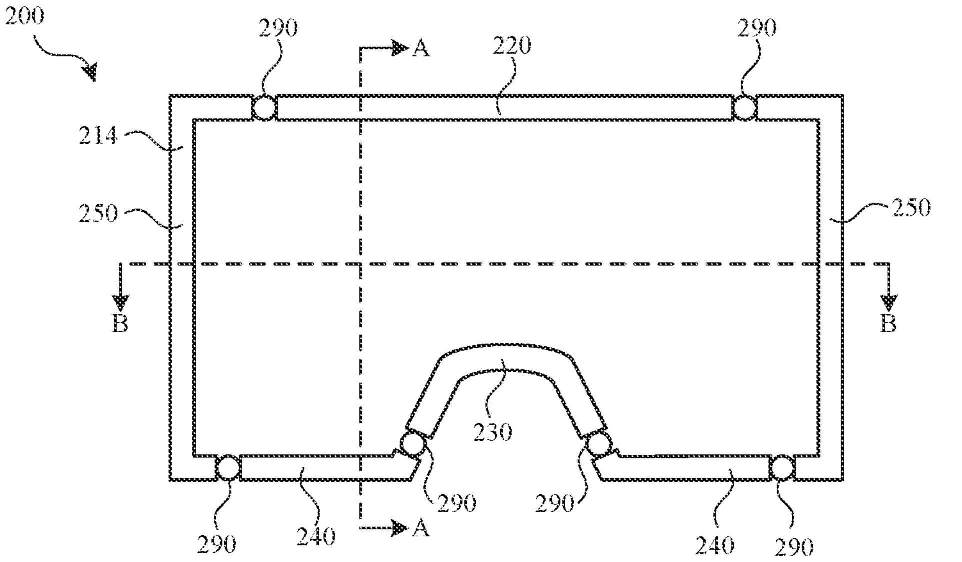
FIG. 2 illustrates a rear view of a light seal element, according to some embodiments of the present disclosure.

Referring now to FIG. 2, a light seal element can be selected with various portions that match the contours of the face of the user. The light seal element 200 can include multiple portions that are moveable (e.g., rotatable) relative to each other to provide different configurations for fits that correspond to different users.

For example, as shown in FIG. 2, the light seal element 200 can include a forehead portion 220 for engaging the forehead of the user, a nose portion 230 for engaging the nose of the user, and cheek portions 240 for engaging the cheeks of the user. By further example, the light seal element 200 can further include side portions 250 configured to engage side of the user's face (e.g., along the temples of the user's head). Any number of other portions can be provided, including sub-components of the portions described herein.

While six separate portions are shown in FIG. 2, it will be understood that any number of discrete portions can be provided. For example, the number of portions defining the inner side 214 of the light seal element 200 can be 1, 2, 3, 4, 5, 6, 7, 8, 9, 10, or more than 10. The portion(s) 220 can, together, define a continuous surface (e.g., on the inner side 214) for engaging the face of the user.

As further shown in FIG. 2, each of the portions can be rotatably coupled at ends thereof by a pair of joints 290. Each of the joints 290 can be a part of or coupled to a corresponding bridge element. The portions can be coupled to the bridge elements by joints 290 that provides rotational movement of the portions. For example, the joints 290 can be or include a ball joint that allows the portions to rotate with one or more degrees of freedom while supporting at least a portion of the portion in a given position. By further example, the joints 290 can include a pivot joint, a hinge joint, a ball-and-socket joint, a saddle joint, and the like. The joints 290 can be coupled to ends or any region of the corresponding portion. The joints 290 can maintain each portions in a given position while allowing the portion to rotate about an axis. The joints 290 define a range of rotational motion of each of the portions. Each portion can be coupled to one joint 290 or multiple joints 290. Each joint 290 can be coupled to one portion or multiple portions. While multiple joints 290 at ends of each portion, it will be understood that a single joint 290 can provide a range of rotational motion for any given portion.

Figure 3:
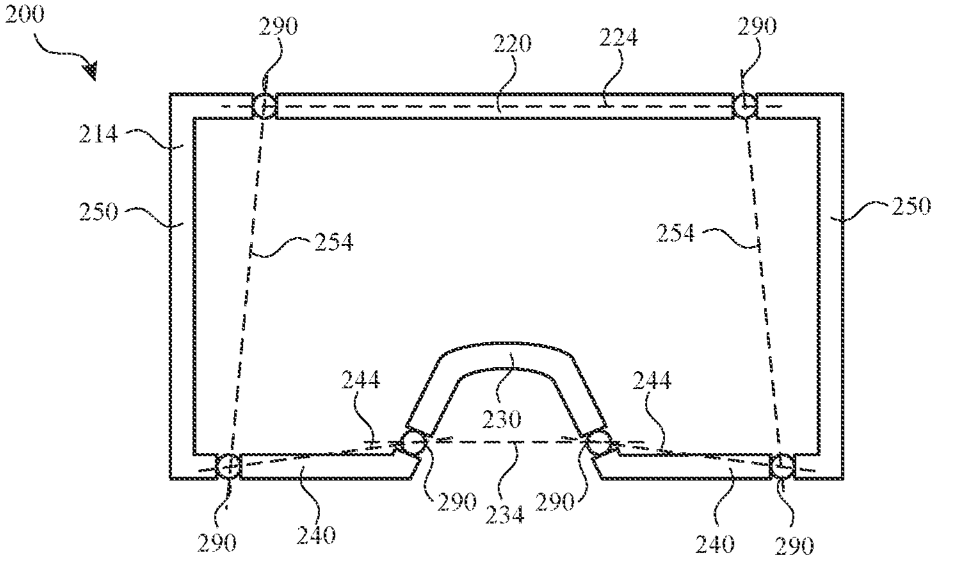
FIG. 3 illustrates a rear view of a light seal element, according to some embodiments of the present disclosure.

Referring now to FIG. 3, the joints 290 can provide points of rotation about an axis for the corresponding portion. By providing a pair of joints 290 for each of the portions, the corresponding portion is provided with an ability to rotate about an axis that extends through the corresponding pair of joints 290. For example, the joints 290 at ends of or otherwise coupled to the forehead portion 220 can allow the forehead portion 220 to rotate about a forehead portion axis 224 (e.g., extending through the corresponding pair of joints 290). The joints 290 at ends of the nose portion 230 can allow the nose portion 230 to rotate about a nose portion axis 234 (e.g., extending through the corresponding pair of joints 290). The joints 290 at ends of the each of the cheek portions 240 can allow each of the cheek portions 240 to rotate about a corresponding cheek portion axis 244 (e.g., extending through the corresponding pair of joints 290). The joints 290 at ends of the each of the side portions 250 can allow each of the side portions 250 to rotate about a corresponding side portion axis 254 (e.g., extending through the corresponding pair of joints 290). It will be understood that each axis can be different than and/or non-parallel to any other or every other axis. Each axis of rotation can be defined by the location and configuration of the corresponding joints 290 and selected in a manner that allows the corresponding portion to adapt to a range of facial feature contours of users that may user the light seal element. While the axes of FIG. 4 are shown extending through pairs of joints 290, it will be understood that the axis can be defined by only one joint 290 and/or by more than two joints 290.

Figure 4:
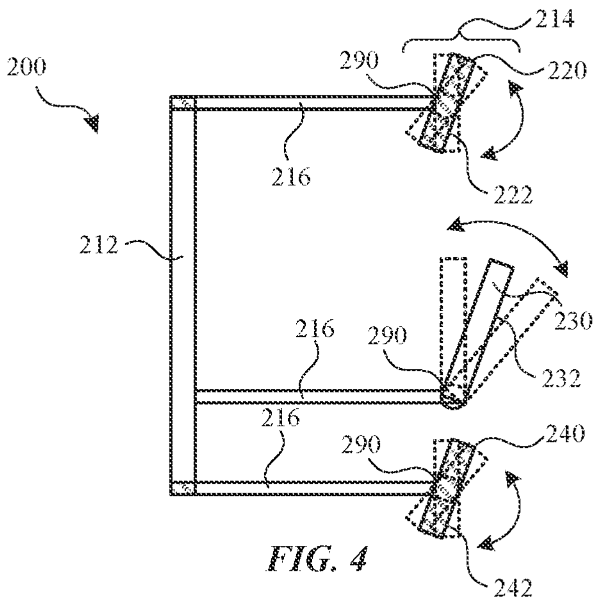
FIG. 4 illustrates a side sectional view of a light seal element taken along line A-A of FIG. 2, according to some embodiments of the present disclosure.
Figure 5:
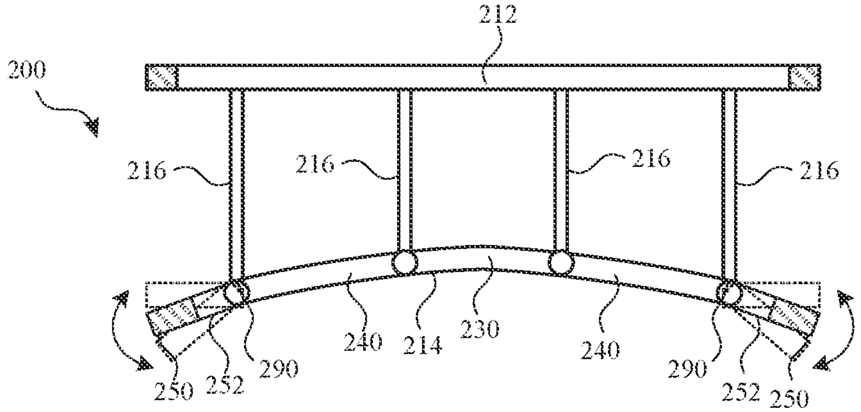
FIG. 5 illustrates a top sectional view of a light seal element taken along line B-B of FIG. 2, according to some embodiments of the present disclosure.

Referring now to FIGS. 4 and 5, the portions of the light seal element can rotate within a correspond range of motion to adapt to the contours of the face of the user. As shown in FIG. 4, one or more bridge elements 216 can extend from the outer side 212 of the light seal element 200 to support a joint 290 at or near an end thereof. Each of the portions can be coupled to a corresponding joint 290 to provide a range of rotational motion. Such motion allows the portions to change its orientation to align an engagement surface thereof with a region of the user's face.

As shown in FIG. 4, the forehead portion 220 can rotate about one or more joints 290 to adjust an orientation thereof. By changing the orientation, a forehead portion engagement surface 222 of the forehead portion 220 can be adjusted to be parallel to a forehead of the user. By allowing such an adjustment, the surface contact area between the forehead portion engagement surface 222 and the forehead of the user is maximized.

As further shown in FIG. 4, the nose portion 230 can rotate about one or more joints 290 to adjust an orientation thereof. By changing the orientation, a nose portion engagement surface 232 of the nose portion 230 can be adjusted to be parallel to a nose of the user. By allowing such an adjustment, the surface contact area between the nose portion engagement surface 232 and the nose of the user is maximized.

As further shown in FIG. 4, the cheek portion 240 can rotate about one or more joints 290 to adjust an orientation thereof. By changing the orientation, a cheek portion engagement surface 242 of the cheek portion 240 can be adjusted to be parallel to a cheek of the user. By allowing such an adjustment, the surface contact area between the cheek portion engagement surface 242 and the cheek of the user is maximized. Such adjustments can be made independently for each of a pair of cheek portions 240.

As shown in FIG. 5, each of the side portions 250 can rotate about one or more joints 290 to adjust an orientation thereof. By changing the orientation, a side portion engagement surface 252 of the side portion 250 can be adjusted to be parallel to a forehead of the user. By allowing such an adjustment, the surface contact area between the side portion engagement surface 252 and the forehead of the user is maximized.

The head securement element can gently pull the light seal element 200 against the face of the user to urge the engagement surfaces to align with the facial regions of the user. As the light seal element is pulled toward and against the face of the user, the corresponding portions can rotate as they engage the facial features until each of the engagement surfaces is aligned (e.g., parallel with and abutting) the corresponding facial region. As such, the forces against the face can be distributed widely across the engagement surfaces of the portions to enhance comfort of the user. While the portions can include rigid parts, the engagement surfaces can be compliant to enhance comfort of the user.

In some embodiments, the portions can rotate freely within a range of rotational motion. Additionally or alternatively, one or more of the portions can be biased to a particular orientation while allowing rotation to other orientations. For example, the joints 290 or another biasing element (e.g., spring, resilient member, etc.) can bias the corresponding portion to a particular orientation. Such an orientation can be one that engages the face of the user.

For example, each of the side portions 250 can be biased toward each other so that, when worn, the side portions 250 are biased toward the sides of the user's head. Biasing of the side portions 250 can help facilitate engagement. For example, the head securement element may pull the forehead portion 220, the nose portion 230, and the cheek portions 240 into direct contact with the corresponding forward-facing facial regions. However, the head securement element may not provide a pulling action that would pull the side portions 250 directly to the sides of the user's head. Accordingly, the side portions 250 can be biased by the joints 290 or another mechanism to engage the sides of the user's head. This can enhance light sealing features and help distribute forces across the side portions 250. In some embodiments, the bias and/or rotational movement of the portions can be achieved by operation of a motor and/or actuator to control the portions to a desired or target orientation.

Figure 6:
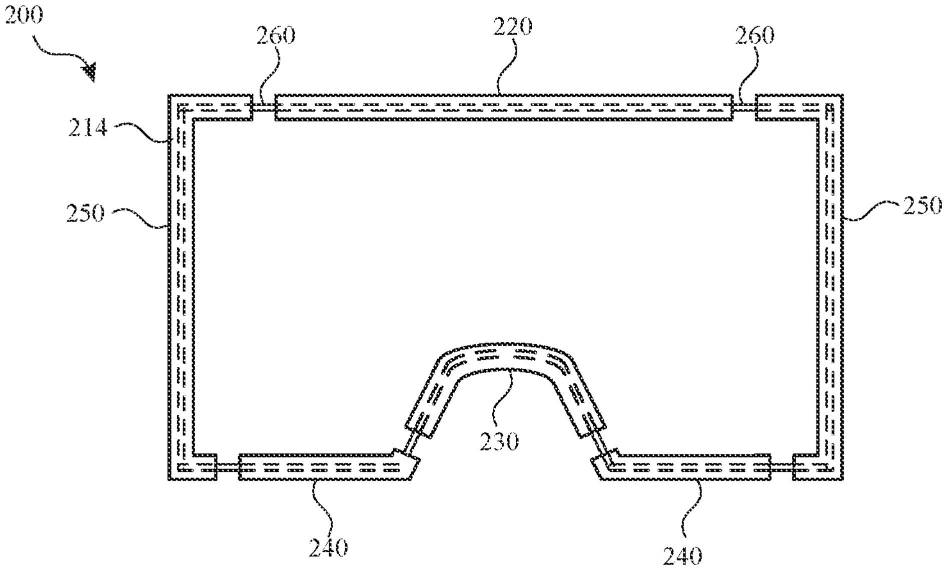
FIG. 6 illustrates a rear view of a light seal element, according to some embodiments of the present disclosure.
Figure 7:
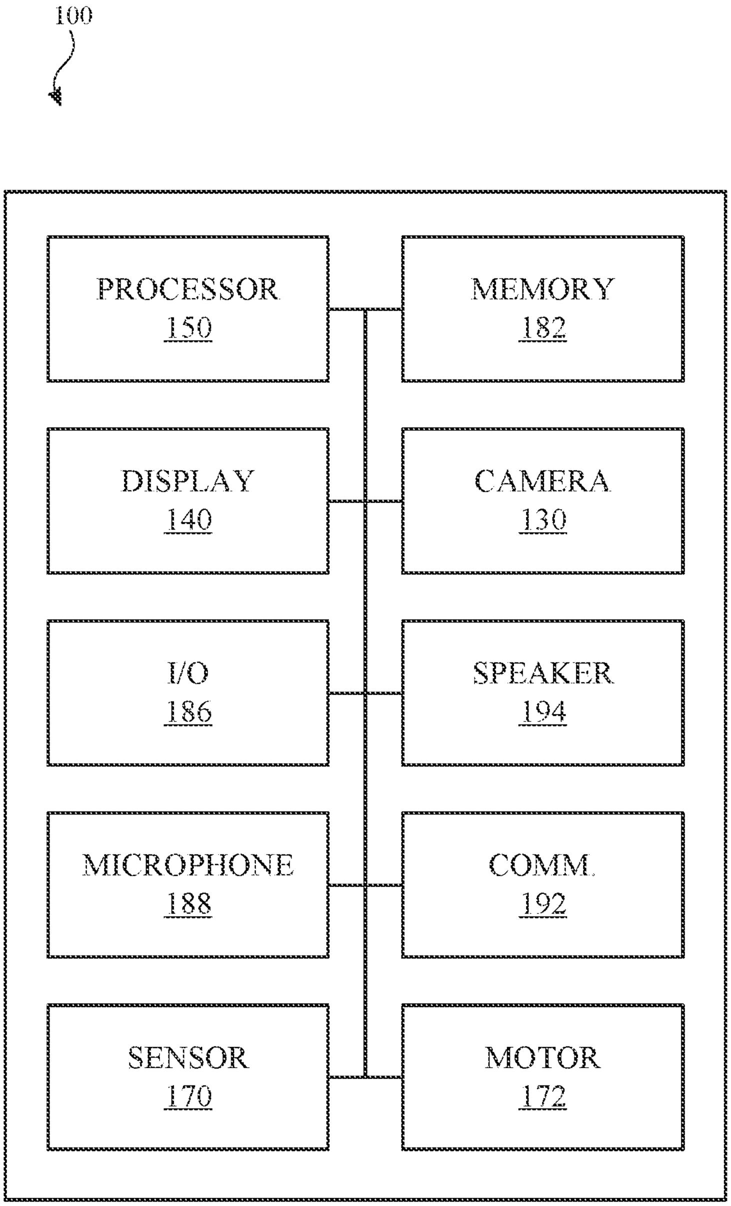
FIG. 7 illustrates a block diagram of a head-mountable device, in accordance with some embodiments of the present disclosure.

Referring now to FIG. 6, the portions can be connected to each other in a manner that facilitates independent and relative rotation thereof. As shown in FIG. 6, the forehead portion 220, the nose portion 230, the cheek portions 240, and the side portions 250 can be connected with a single cable 260 or chain of cables. The cable 260 can extend through each of the portions and/or between adjacent pairs of portions. The cable 260 can facilitate relative rotation of the portions by allowing rotation of the portions about the cable 260. The cable 260 can further facilitate relative rotation of the portions by allowing a degree of bending to occur between adjacent pairs of portions. The portions can be coupled to the bridge elements, for example, at locations between adjacent pairs of portions.

The adjustments and configurations described herein can be utilized to offer different configurations for different users. For example, the light seal element can be adjustable to accommodate features of different users, thereby providing a preferred and customizable fit. Accordingly, the same head-mountable device can be used by various users in the corresponding configuration for each user.

Referring now to FIG. 8, components of the head-mountable device can be operably connected to provide the performance described herein. FIG. 8 shows a simplified block diagram of an illustrative head-mountable device 100 in accordance with one embodiment of the invention. It will be appreciated that components described herein can be provided on one, some, or all of an HMD module, a light seal element, and/or a head securement element. It will be understood that additional components, different components, or fewer components than those illustrated may be utilized within the scope of the subject disclosure.

As shown in FIG. 8, the head-mountable device 100 can include a processor 150 (e.g., control circuitry) with one or more processing units that include or are configured to access a memory 182 having instructions stored thereon. The instructions or computer programs may be configured to perform one or more of the operations or functions described with respect to the head-mountable device 100. The processor 150 can be implemented as any electronic device capable of processing, receiving, or transmitting data or instructions. For example, the processor 150 may include one or more of: a microprocessor, a central processing unit (CPU), an application-specific integrated circuit (ASIC), a digital signal processor (DSP), or combinations of such devices. As described herein, the term "processor" is meant to encompass a single processor or processing unit, multiple processors, multiple processing units, or other suitably configured computing element or elements.

The memory 182 can store electronic data that can be used by the head-mountable device 100. For example, the memory 182 can store electrical data or content such as, for example, audio and video files, documents and applications, device settings and user preferences, timing and control signals or data for the various modules, data structures or databases, and so on. The memory 182 can be configured as any type of memory. By way of example only, the memory 182 can be implemented as random access memory, read-only memory, Flash memory, removable memory, or other types of storage elements, or combinations of such devices.

The head-mountable device 100 can further include a display element 140 for displaying visual information for a user. The display element 140 can provide visual (e.g., image or video) output. The display element 140 can be or include an opaque, transparent, and/or translucent display. The display element 140 may have a transparent or translucent medium through which light representative of images is directed to a user's eyes. The display element 140 may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface. The head-mountable device 100 can include an optical subassembly configured to help optically adjust and correctly project the image-based content being displayed by the display element 140 for close up viewing. The optical subassembly can include one or more lenses, mirrors, or other optical devices.

The head-mountable device 100 can include one or more sensors 170, as described herein. The head-mountable device 100 can include one or more other sensors. Such sensors can be configured to sense substantially any type of characteristic such as, but not limited to, images, pressure, light, touch, force, temperature, position, motion, and so on. For example, the sensor can be a photodetector, a temperature sensor, a light or optical sensor, an atmospheric pressure sensor, a humidity sensor, a magnet, a gyroscope, an accelerometer, a chemical sensor, an ozone sensor, a particulate count sensor, and so on. By further example, the sensor can be a bio-sensor for tracking biometric characteristics, such as health and activity metrics. Other user sensors can perform facial feature detection, facial movement detection, facial recognition, eye tracking, user mood detection, user emotion detection, voice detection, etc. Sensors can include a camera which can capture image based content of the outside world.

The head-mountable device 100 can include an input/output component 186, which can include any suitable component for connecting head-mountable device 100 to other devices. Suitable components can include, for example, audio/video jacks, data connectors, or any additional or alternative input/output components. The input/ output component 186 can include buttons, keys, or another feature that can act as a keyboard for operation by the user.

The head-mountable device 100 can include the microphone 188 as described herein. The microphone 188 can be operably connected to the processor 150 for detection of sound levels and communication of detections for further processing, as described further herein.

The head-mountable device 100 can include one or more speakers 194. The speakers 194 can be operably connected to the processor 150 for control of audio output, including sound levels, as described further herein.

The head-mountable device 100 can include communications circuitry 192 for communicating with one or more servers or other devices using any suitable communications protocol. For example, communications circuitry 192 can support Wi-Fi (e.g., a 802.11 protocol), Ethernet, Bluetooth, high frequency systems (e.g., 900 MHz, 2.4 GHz, and 5.6 GHz communication systems), infrared, TCP/IP (e.g., any of the protocols used in each of the TCP/IP layers), HTTP, BitTorrent, FTP, RTP, RTSP, SSH, any other communications protocol, or any combination thereof. Communications circuitry 192 can also include an antenna for transmitting and receiving electromagnetic signals.

The head-mountable device 100 can include a battery, which can charge and/or power components of the head-mountable device 100. The battery can also charge and/or power components connected to the head-mountable device 100.

The head-mountable device 100 can include adjustment control components described herein, such as a motor 172, an actuator, and the like for moving components to a desired relative position and/or orientation.

Accordingly, embodiments of the present disclosure provide a head-mountable device with adaptable components, which move to comfortably engage the face of the user and to exclude light from an external environment. A head-mountable device can include a light seal element that includes discrete portions that rotate relative to each other and to a user. Such mobility allows the portions to be oriented with respect to corresponding regions of the face, so that an engagement surface of each portion directly engages the corresponding region of the face to maximize the surface area of contact.

Various examples of aspects of the disclosure are described below as clauses for convenience. These are provided as examples, and do not limit the subject technology.

Clause A: a head-mountable device comprising: a frame; a display element supported by the frame; and a light seal element coupled to the frame and comprising: an outer side configured to releasably engage the frame; bridge elements extending from the outer side; a forehead portion and configured to engage a forehead of a user, the forehead portion being rotatably coupled to the outer side by a first pair of the bridge elements; a nose portion configured to engage a nose of the user, the nose portion being rotatably coupled to the outer side by a second pair of the bridge elements; and a first cheek portion configured to engage a first cheek of the user, the first cheek portion being rotatably coupled to the outer side by a third pair of the bridge elements; and a second cheek portion configured to engage a second cheek of the user, the first cheek portion being rotatably coupled to the outer side by a fourth pair of the bridge elements.

Clause B: a head-mountable device comprising: a frame; a display element supported by the frame; a head securement element; a light seal element coupled to the frame and comprising multiple portions that, when the light seal element is pulled toward a face of a user by the head securement element, are each independently rotatable relative to the frame to orient a corresponding engagement surface to be aligned with a corresponding region of the face of the user.

Clause C: a head-mountable device comprising: a frame; a display element supported by the frame; and a light seal element coupled to the frame and comprising: a forehead portion rotatable about a first axis extending through a first pair of joints; a nose portion rotatable about a second axis extending through a second pair of joints; and a cheek portion rotatable about a third axis extending through a third pair of joints.

One or more of the above clauses can include one or more of the features described below. It is noted that any of the following clauses may be combined in any combination with each other, and placed into a respective independent clause, e.g., clause A, B, or C.

Clause 1: a camera configured to capture a view, wherein the display element is configured to display the view; a sensor; a microphone; and a speaker.

Clause 2: the light seal element further comprises: a first side portion configured to engage a first side of a face of the user, the first side portion being rotatably coupled to the outer side by a fifth pair of the bridge elements; and a second side portion configured to engage a second side of the face of the user, the second side portion being rotatably coupled to the outer side by a sixth pair of the bridge elements.

Clause 3: one of the fifth pair of the bridge elements is included in the first pair of the bridge elements; one of the sixth pair of the bridge elements is included in the first pair of the bridge elements; one of the fifth pair of the bridge elements is included in the third pair of the bridge elements; and one of the sixth pair of the bridge elements is included in the fourth pair of the bridge elements.

Clause 4: the first side portion and the second side portion are biased inwardly toward each other.

Clause 5: the forehead portion, the nose portion, the first cheek portion, the second cheek portion, the first side portion, and the second side portion define an inner side of the light seal element.

Clause 6: the frame comprises a frame attachment element on an inner side of the frame; and the light seal element further comprises a light seal attachment element on the outer side of the light seal element, the light seal attachment element being configured to releasably engage the frame attachment element.

Clause 7: each of the first pair of the bridge elements is coupled to the forehead portion by a corresponding first joint; each of the second pair of the bridge elements is coupled to the nose portion by a corresponding second joint; each of the third pair of the bridge elements is coupled to the first cheek portion by a corresponding third joint; and each of the fourth pair of the bridge elements is coupled to the second cheek portion by a corresponding fourth joint.

Clause 8: one of the second pair of the bridge elements is included in the third pair of the bridge elements; and one of the second pair of the bridge elements is included in the fourth pair of the bridge elements.

Clause 9: the light seal element further comprises: an outer side configured to releasably engage the frame; bridge elements extending from the outer side; and in inner side defined by the multiple portions and being coupled to the outer side by the bridge elements.

Clause 10: the multiple portions comprise: a forehead portion configured to rotatably align with a forehead of the user; a nose portion configured to rotatably align with a nose of the user; a first cheek portion configured to rotatably align with a first cheek of the user; a second cheek portion configured to rotatably align with a second cheek of the user; a first side portion configured to rotatably align with a first side of the face of the user; and a second side portion configured to rotatably align with a second side of the face of the user.

Clause 11: the first side portion and the second side portion are biased to engage the face of the user.

Clause 12: the multiple portions can connected to each other by a cable extending through each of the multiple portions and between adjacent pairs of the multiple portions.

Clause 13: the light seal element further comprises a side portion rotatable about a fourth axis extending through a fourth pair of joints.

Clause 14: the side portion is biased to an orientation within a range of motion about the fourth axis.

Clause 15: a head securement element configured to pull the light seal element toward a face of a user when worn.

As described above, one aspect of the present technology may include the gathering and use of data available from various sources. The present disclosure contemplates that in some instances, this gathered data may include personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

A reference to an element in the singular is not intended to mean one and only one unless specifically so stated, but rather one or more. For example, "a" module may refer to one or more modules. An element proceeded by "a," "an," "the," or "said" does not, without further constraints, preclude the existence of additional same elements.

Headings and subheadings, if any, are used for convenience only and do not limit the invention. The word exemplary is used to mean serving as an example or illustration. To the extent that the term include, have, or the like is used, such term is intended to be inclusive in a manner similar to the term comprise as comprise is interpreted when employed as a transitional word in a claim. Relational terms such as first and second and the like may be used to distinguish one entity or action from another without necessarily requiring or implying any actual such relationship or order between such entities or actions.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

A phrase "at least one of" preceding a series of items, with the terms "and" or "or" to separate any of the items, modifies the list as a whole, rather than each member of the list. The phrase "at least one of" does not require selection of at least one item; rather, the phrase allows a meaning that includes at least one of any one of the items, and/or at least one of any combination of the items, and/or at least one of each of the items. By way of example, each of the phrases "at least one of A, B, and C" or "at least one of A, B, or C" refers to only A, only B, or only C; any combination of A, B, and C; and/or at least one of each of A, B, and C.

It is understood that the specific order or hierarchy of steps, operations, or processes disclosed is an illustration of exemplary approaches. Unless explicitly stated otherwise, it is understood that the specific order or hierarchy of steps, operations, or processes may be performed in different order. Some of the steps, operations, or processes may be performed simultaneously. The accompanying method claims, if any, present elements of the various steps, operations or processes in a sample order, and are not meant to be limited to the specific order or hierarchy presented. These may be performed in serial, linearly, in parallel or in different order. It should be understood that the described instructions, operations, and systems can generally be integrated together in a single software/hardware product or packaged into multiple software/hardware products.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

The disclosure is provided to enable any person skilled in the art to practice the various aspects described herein. In some instances, well-known structures and components are shown in block diagram form in order to avoid obscuring the concepts of the subject technology. The disclosure provides various examples of the subject technology, and the subject technology is not limited to these examples. Various modifications to these aspects will be readily apparent to those skilled in the art, and the principles described herein may be applied to other aspects.

All structural and functional equivalents to the elements of the various aspects described throughout the disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The title, background, brief description of the drawings, abstract, and drawings are hereby incorporated into the disclosure and are provided as illustrative examples of the disclosure, not as restrictive descriptions. It is submitted with the understanding that they will not be used to limit the scope or meaning of the claims. In addition, in the detailed description, it can be seen that the description provides illustrative examples and the various features are grouped together in various implementations for the purpose of streamlining the disclosure. The method of disclosure is not to be interpreted as reflecting an intention that the claimed subject matter requires more features than are expressly recited in each claim. Rather, as the claims reflect, inventive subject matter lies in less than all features of a single disclosed configuration or operation. The claims are hereby incorporated into the detailed description, with each claim standing on its own as a separately claimed subject matter.

The claims are not intended to be limited to the aspects described herein, but are to be accorded the full scope consistent with the language of the claims and to encompass all legal equivalents. Notwithstanding, none of the claims are intended to embrace subject matter that fails to satisfy the requirements of the applicable patent law, nor should they be interpreted in such a way.

What is claimed is:

1. A head-mountable device comprising:
a frame;
a display element supported by the frame; and
a light seal element coupled to the frame and comprising:
 an outer side configured to releasably engage the frame;
 bridge elements extending from the outer side;
 a forehead portion configured to engage a forehead of a user, the forehead portion being coupled to the outer side by a first pair of joints configured to provide the forehead portion with rotational movement with respect to the outer side of the light seal element and about a first axis extending through the first pair of joints;
 a nose portion configured to engage a nose of the user, the nose portion being coupled to the outer side by a second pair of joints configured to provide the nose portion with rotational movement with respect to the outer side of the light seal element and about a second axis extending through the second pair of joints;
 a first cheek portion configured to engage a first cheek of the user, the first cheek portion being coupled to the outer side by a third pair of the joints configured to provide the first cheek portion with rotational movement with respect to the outer side of the light seal element and about a third axis extending through the third pair of joints, wherein the third pair of the joints includes a first joint of the second pair of joints;

a second cheek portion configured to engage a second cheek of the user, the first cheek portion being coupled to the outer side by a fourth pair of joints configured to provide the second cheek portion with rotational movement with respect to the outer side of the light seal element and about a fourth axis extending through the fourth pair of joints, wherein the fourth pair of the joints includes a second joint of the second pair of joints; and a side portion configured to engage a side of a face of the user, the side portion being coupled to the outer side by a fifth pair of joints configured to provide the side portion with rotational movement with respect to the outer side of the light seal element and about a fifth axis extending through the fifth pair of joints, wherein the fifth pair of the joints includes a first joint of the first pair of joints.

2. The head-mountable device of claim 1, further comprising:

a camera configured to capture a view, wherein the display element is configured to display the view;

a sensor;

a microphone; and a speaker.

3. The head-mountable device of claim 1, wherein the side is a first side, wherein the side portion is a first side portion, and wherein the light seal element further comprises:

a second side portion configured to engage a second side of the face of the user, the second side portion being coupled to the outer side by a sixth pair of joints configured to provide the second side portion with rotational movement with respect to the outer side of the light seal element and about a sixth axis extending through the sixth pair of joints, wherein the sixth pair of the joints includes a second joint of the first pair of joints.

4. The head-mountable device of claim 3, wherein:

one of the fifth pair of joints is included in the third pair of joints; and one of the sixth pair of joints is included in the fourth pair of joints.

5. The head-mountable device of claim 3, wherein the first side portion and the second side portion are biased inwardly toward each other.

6. The head-mountable device of claim 3, wherein the forehead portion, the nose portion, the first cheek portion, the second cheek portion, the first side portion, and the second side portion define an inner side of the light seal element.

7. The head-mountable device of claim 1, wherein:

the frame comprises a frame attachment element on an inner side of the frame; and the light seal element further comprises a light seal attachment element on the outer side of the light seal element, the light seal attachment element being configured to releasably engage the frame attachment element.

8. The head-mountable device of claim 1, wherein:

the forehead portion is coupled to the outer side by a first pair of the bridge elements;

the nose portion is coupled to the outer side by a second pair of the bridge elements;

the first cheek portion is coupled to the outer side by a third pair of the bridge elements; and the second cheek portion is coupled to the outer side by a fourth pair of the bridge elements.

9. The head-mountable device of claim 1, wherein:

one of the second pair of the bridge elements is included in the third pair of the bridge elements; and one of the second pair of the bridge elements is included in the fourth pair of the bridge elements.

10. A head-mountable device comprising:

a frame;

a display element supported by the frame;

a head securement element; and a light seal element coupled to the frame and comprising multiple portions defining a continuous surface for engaging a face of a user, wherein each respective one of the multiple portions defining the continuous surface is coupled to the frame by a respective pair of joints that are configured to provide the respective one of the multiple portions with rotational movement about a respective axis that extends through the respective pair of joints and relative to the frame to orient a respective engagement surface to be aligned with a respective region of the face of the user, wherein each of the joints is directly coupled to multiple ones of the multiple portions defining the continuous surface.

11. The head-mountable device of claim 10, wherein the light seal element further comprises:

an outer side configured to releasably engage the frame;

bridge elements extending from the outer side; and in inner side defined by the multiple portions and being coupled to the outer side by the bridge elements.

12. The head-mountable device of claim 11, wherein:

the frame comprises a frame attachment element on an inner side of the frame; and the light seal element further comprises a light seal attachment element on an outer side of the light seal element, the light seal attachment element being configured to releasably engage the frame attachment element.

13. The head-mountable device of claim 10, wherein the multiple portions comprise:

a forehead portion configured to rotatably align with a forehead of the user;

a nose portion configured to rotatably align with a nose of the user;

a first cheek portion configured to rotatably align with a first cheek of the user;

a second cheek portion configured to rotatably align with a second cheek of the user;

a first side portion configured to rotatably align with a first side of the face of the user; and a second side portion configured to rotatably align with a second side of the face of the user.

14. The head-mountable device of claim 13, wherein the first side portion and the second side portion are biased to engage the face of the user.

15. The head-mountable device of claim 13, wherein the multiple portions are connected to each other by a cable extending through each of the multiple portions and between adjacent pairs of the multiple portions.

16. A head-mountable device comprising:

a frame;

a display element supported by the frame; and a light seal element coupled to the frame and comprising:

a forehead portion coupled to the frame by a first pair of joints that are configured to provide the forehead portion with rotational movement about an axis that extends through the first pair of joints;

a nose portion coupled to the frame by a second pair of joints that are configured to provide the nose portion with rotational movement about an axis that extends through the second pair of joints;

a cheek portion coupled to the frame by a third pair of joints that are configured to provide the cheek portion with rotational movement about an axis that extends through the third pair of joints, wherein the third pair of joints includes a joint of the second pair of joints; and a side portion coupled to the frame by a fourth pair of joints that are configured to provide the side portion with rotational movement about an axis that extends through the fourth pair of joints, wherein the fourth pair of joints includes a joint of the first pair of joints.

17. The head-mountable device of claim 16, wherein the cheek portion is a first cheek portion, and wherein the side portion is a first side portion, the head-mountable device further comprising a second cheek portion and a second side portion.

18. The head-mountable device of claim 16, wherein the side portion is biased to an orientation within a range of motion about the axis that extends through the fourth pair of joints.

19. The head-mountable device of claim 16, further comprising a head securement element configured to pull the light seal element toward a face of a user when worn.

20. The head-mountable device of claim 16, wherein:

the frame comprises a frame attachment element on an inner side of the frame; and the light seal element further comprises a light seal attachment element on an outer side of the light seal element, the light seal attachment element being configured to releasably engage the frame attachment element.

21. The head-mountable device of claim 10, wherein a first portion and a second portion of the multiple portions are adjacent to each other along the continuous surface, wherein the first portion is rotatable about a first axis and the second portion is rotatable about a second axis different from the first axis, and wherein the first axis and the second axis intersect at a joint that is directly coupled to each of the first portion and the second portion.

22. The head-mountable device of claim 16, wherein the axis that extends through the first pair of joints intersects the axis that extends through the fourth pair of joints at the joint of the first pair of joints.

* * * * *